Oct. 5, 1965  MOTOCHIKA KAWAI ETAL  3,210,218
PROCESS OF MANUFACTURING BATTERY SEPARATORS
Filed July 12, 1962
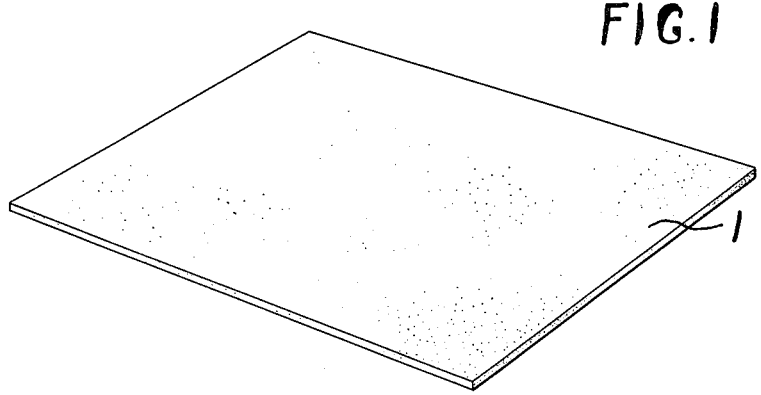
FIG.1
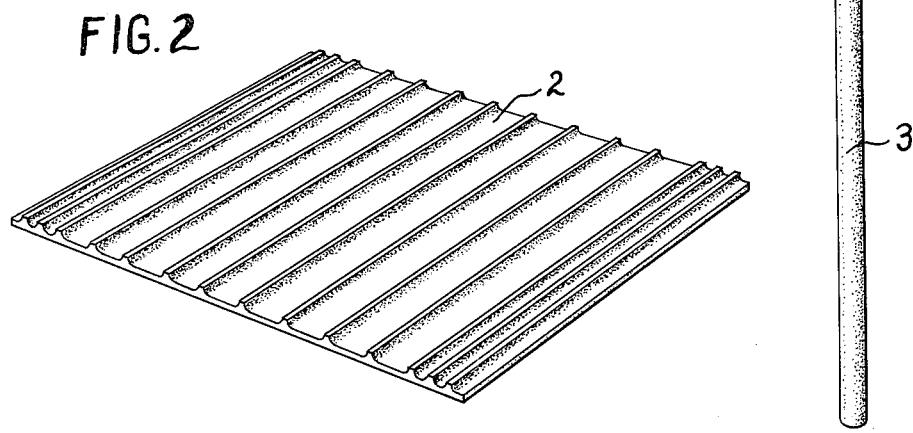
FIG.2
FIG.3
INVENTOR.
MOTOCHIKA KAWAI
AND KATSUMI OBA
BY
Linton and Linton
ATTORNEYS 3,210,218
PROCESS OF MANUFACTURING BATTERY
SEPARATORS
Motochika Kawai and Katsumi Oba, Fujisawa, Japan,
assignors to Nihon Mukiseni Kogyo Kabushiki Kaisha,
Tokyo, Japan, a corporation of Japan
Filed July 12, 1962, Ser. No. 210,304
Claims priority, application Japan, Aug. 21, 1961,
36/29,599
2 Claims. (Cl. 136—148)

The present invention relates to a storage battery separator and a manufacturing process thereof, and is more particularly directed to a storage battery separator which is principally made of diatomaceous earth and a manufacturing process of the same.

According to the present invention, there is prepared a mixed solvent by mixing 1 part of such a strong solvent for vinyl chlorides as cyclohexanone with 3 to 4 parts of such a diluent as solvent naphtha, and in the mixed solvent a plastic of polyvinyl chloride or a copolymer of vinyl chloride and vinyl acetate is dissolved for making a sol solution, and the sol solution is kneaded with fine powder of diatomaceous earth to form a dough. Thereafter, the dough is added with ammonium oleate amounting to above ¼ part of the plastic, and with water amounting to below ⅛ part of the mixed solvent, and kneaded therewith to obtain a putty material. Then, the putty material is formed into any desired shape by an extruder or a multistage roll and dried. The separator material may be dried in conventional manner whereby there is obtained a product that is an excellent storage battery separator.

From comparatively old times, it has been known that diatomaceous earth could be used as the principal raw material for such purposes and is produced to be a separator by being formed into a sheet or other forms by the aid of a binding agent. The reason why diatomaceous earth is selected as the raw material for a storage battery separator is based on the fact that the same has such excellent characteristics that the same causes no chemical change in a storage battery and is of such a porosity that it contains about 90% of cell pores small enough not to pass even a slime of 0.1μ. This product, however, is poor in strength as a separator and needs to increase the amount of the binding agent in order to improve the strength, though such increase increases considerably the electric resistance feature of the product. By these and other reasons, diatomaceous earth by itself is put into practice as a separator to only a very limited extent but is merely used in a modified manner such that a reinforcing material such as a glass-fiber plate, that is the base, is coated with the same to be a separator.

In the accompanying drawings:

FIGURE 1 is a perspective view of a sheet storage battery separator according to the present invention.

FIGURE 2 is a perspective view of a modification of the present invention in the form of a ribbed sheet separator, and FIGURE 3 is a perspective view of a further modification of the invention in the form of a tube.

According to the present invention, diatomaceous earth is used as the principal component and is firmly bonded, without closing the cell pores, by a chemically stable binding agent and is formed in any desired shape such as a sheet 1, a sheet 2 with ribs, a tube 3 or others, so that there may be obtained a storage battery separator which is low in electric resistance, large in mechanical strength, facilitates the diffusion of the electrolyte, and prevents the passage of the active material. And such bonding formation of diatomaceous earth powder is attained by the way that a sol of polyvinyl chloride treated with an incomplete solvent is used as a binding agent for the diatomaceous earth, and the definite amounts of both water and ammonium oleate, which serves as a dispersing and wetting agent, are additionally used. The step to limit the amount ratio of the strong solvent to the diluent in the mixed solvent within the range of from ⅓ to ¼, is based on the principle that if the ratio is above ⅓, polyvinyl chloride is completely dissolved so that the dried film of polyvinyl chloride closes the cell pores and the spaces between the particles of the diatomaceous earth and the product becomes a sheet of high electric resistance, no melting by heat is needed according to the present invention, while this ratio is between one-third and one-fourth.

If, on the contrary, this ratio is below ¼, which is not according to the present invention the mixed solvent becomes of considerable insolubility and the greater part of the polyvinyl chloride remains in the form of swollen particles so that for this case where the ratio is below one-quarter, to the extent that the polyvinyl chloride is not melted by heat, the dried film of the polyvinyl chloride does not become a continuous film and so the bonding of the diatomaceous earth is weak and the strength thereof is considerably low.

And then in the present invention, the sol solution of polyvinyl chloride has diatomaceous earth added and it is kneaded therewith to be a dough. The dough is treated with suitable amounts of ammonium oleate and water to be a so-called W/O type (water-oleate) emulsion of vinyl chloride so that the film of polyvinyl chloride after being dried may not close the cell pores and the spaces between the particles. The cause of this action is not clear but it may be considered that the particles of water dispersed in the oil system act to form pin holes in the film. If, on the contrary, the emulsion is of the O/W type, the distance between the polyvinyl chloride particles is increased and the particles are increased in the tendency to dry separately, and consequently the dried film becomes an extremely discontinuous network and is considerably lowered in strength. And the W/O type emulsification of the polyvinyl chloride can be obtained by determining the amount of the water to be below ⅛ of that of the mixed solvent and the amount of the ammonium oleate to be above ¼ of that of the plastic.

One example of the present invention will be explained as follows:

1 part, by weight, of powder of polyvinyl chloride, which is 1100 in degree of polymerization, is dissolved in 4 parts, by weight, of a mixed solution, which has been prepared by mixing cyclohexanone and solvent naphtha in the ratio of between 1 to 3 and 1 to 4. The resultant sol solution is added with from 1.5 to 4 parts, by weight, of fine powder of diatomaceous earth and stirred and kneaded therewith by a mill to form a dough. The dough is treated with from ½ to ¼ part, by weight, of ammonium oleate and ½ part, by weight, of water and is again kneaded into a putty material. Then, the putty material is formed by an extruder or a multistage roll into a sheet or a tube, and is dried to be a finished product in conventional manner. If, in the case when the material is formed by the extruder, an attachment is provided at the end of a die, there may be obtained a sheet having ribs on its surface. If, additionally, in this case the attachment is moved to the right and the left, the ribs may be of zig-zag form.

The separator thus obtained and other separators as hitherto known were tested for comparison, the results being as shown by the following table.

| | Electric resistance, Ω/dm.²/mm. | Tensile strength, kg./mm.² | Brittleness, mm. | Oxidation resistance time |
|---|---|---|---|---|
| The present invention product | 0.0020–0.0030 | 0.8–1.6 | above 90 | above 2,000 |
| Wooden product | 0.0020–0.0040 | above 0.08 | | 50–90 |
| Reinforced fiber product | 0.0020–0.0030 | 0.6–1.4 | 35–40 | 50–90 |

Herein, the electric resistance and the tensile strength are measured in accordance with the Japanese Industrial Standard (JIS), and the brittleness is shown by the advanced distance when a sheet of 10 mm. in width and 100 mm. in length is bent in its longitudinal direction to break, so that it can be said that the larger the value is, the stronger the sample is, and the oxidation resistance time is the value in a test which is carried out with an electric current of 10 amps./dm.², under plate pressure of 20 kgs./dm.² in sulfuric acid, sp. gr. 1.300 (at 20° C.), of 45° C.

The present invention product, furthermore, has its characteristics as shown below:

Reductive organic substance _____ Below 15.
Volatile organic acid _____ Below 0.5.
Thermal deformation amount _____ Below 3.5.
Free chlorine _____ Trace.
Vesicatory amount _____ 0 mm.
Permeability _____ Below 1 sec.

The test methods of the above-mentioned characteristics are as follows:

*Electric resistance.*—There is used such a sample that the effective passage area of electric current becomes 0.2 dm.² when pure lead plates are adopted as the plates in an electrolytic vessel containing dilute sulfuric acid, sp. gr. 1.200 (at 20° C.), of 25±2° C. The resistant value per 1 dm.² in area and 1 mm. in thickness is calculated from the voltage drop before and after the insertion of the sample when there flows an electric current of 1 amp.

*Tensile strength.*—A sample of 70 mm. length, which is 10 mm. in width at the middle portion and 20 mm. in width at the grip portions is tested by a tensile tester of Shopper's type of below 25 kgs. capacity. The test value is shown by the tensile load divided by the sectional area of the broken portion.

*Brittleness.*—A slender sample of 10 mm. in width and 100 mm. in length is supported by a fixed index and a free index and is curved in its longitudinal direction at a constant rate of speed. In this case, there is used such an apparatus that the rate of speed of the free index may be kept at 2 mm. per second until the sample is broken. The advanced distance of the free index when the sample is broken is deducted from 100 to obtain the test value.

*Oxidation resistance time.*—A sample of 70 square mm.² is held between a pair of pure lead plates of 50 mm.² square under a pressure of 20 kgs./dm.² in dilute sulfuric acid, sp. gr. 1.300 (at 20° C.), of 45° C., and there flows an electric current of 10 amps./dm.². The time until the sample is oxidized to cause an electric short circuit and thereby the electric voltage is suddenly dropped, is converted into the value per 1 mm. thickness of the sample.

*Reductive organic substance.*—Ten samples, each being 1 dm.² in area, are immersed for 24 hours in 1 liter of dilute sulfuric acid, sp. gr. 1.260 (at 20° C.), of 50±2° C., and the extracted solution is neutralized with sodium hydroxide solution. After the neutralized solution has been treated with potassium permanganate and sodium hydroxide and left for 24 hours, the same is acidified with sulfuric acid and, after being heated, faded with sodium oxalate solution, and then is titrated with 0.1 N potassium permanganate. The reductive organic substance value is shown by the consumption amount of 0.1 N potassium permanganate per 1 dm.² area and 1 mm. thickness of the sample.

*Volatile organic acid.*—2 anode plates and 3 cathode plates, each being made of lead and 95 mm.² in area, are alternatively combined and are inserted in an electrolytic vessel of 1 liter capacity, and each one sample separator sheet is inserted between two adjacent plates. The vessel is charged with 500 cc. of dilute sulfuric acid at 25±2° C. and there flows a direct current of 1.2 amps. for 24 hours continuously. Thereafter, the electrolyte is neutralized with 20% NaOH solution and distilled at a temperature from 130 to 150° C. The distilled liquid is titrated with N/10 Ba(OH)$_2$ using phenol phthalein as indicator. The acid value is shown by the consumption amount of N/10 Ba(OH)$_2$ per 30 cc. of sulfuric acid. This test requires a blank control test.

*Thermal deformation amount.*—A sample with ribs is set in almost the same manner as in the oxidation resistance time test and is left for 24 hours without passing an electric current. The decrease in thickness is shown in percentages in comparison with the original thickness.

*Free chlorine.*—A sample is immersed in distilled water for 24 hours, and the extracted solution is tested by Mohr's method or a nephelometry method. The free chlorine is shown by the number of mgs. per 1 square dm. and one sheet of the sample.

*Vesicatory amount.*—2 samples, each being 1 dm.² in area, held between two lead plates are inserted in an electrolytic vessel of 700 cc. capacity together with dilute sulfuric acid of sp. gr. 1.300, and the vessel has its cover applied until the inner surface of the cover sinks completely in the electrolyte. When there flows an electric current of 0.6 amp., the produced amount of bubbles within a glass tube, which is 10 mm. in inner diameter and standing at the central portion of the cover, is read in height from the level of the electrolyte, from which height is obtained the vesicatory amount.

*Permeability.*—A sample of 70 mm.² square is dropped horizontally onto the surface of a bath of dilute sulfuric acid, sp. gr. 1.200, from the height of 30 mm. The test value is shown by the number of the seconds until the whole surface of the sample is wetted.

The separator of the present invention has a large number of very small pores distributed uniformly through the whole portion, and may be compared in this respect, for example, with an ordinary resin-reinforced paper separator made of a base paper impregnated with phenol resin.

Owing to its smallness in pore size, the separator of the present invention has brought the best result in the following lead powder lixiviation test. Namely, various kinds of separators were tested respectively in such a manner that three separators of the same kind are held between a pair of anode and cathode plates under a pressure of 20 kgs./dm.² at 50° C. for passing an electric current of 10 amps./dm.² for 20 hours. There was found lixiviation of lead powder through the separators in the case of other kinds of separators, whereas there was observed no lixiviation in the case of the separators of the present invention.

What we claim is:

1. A manufacturing process of a storage battery separator which process consists of preparing a mixed solvent by mixing 1 part of cyclohexanone which is a strong solvent for vinyl chlorides with 3 to 4 parts of solvent naphtha, dissolving in said mixed solvent 1 part by weight of a plastic member of the group consisting of polyvinyl chloride and a co-polymer of vinyl chloride and vinyl acetate to constitute a sol solution, making a dough by adding to said sol solution 1.5 to 4 parts by weight of fine powder of diatomaceous earth, then making a putty material by adding to said dough ammonium oleate in amounts to above one-quarter of said plastic and also adding water in amounts to below one-eighth of said mixed solvent, and extruding said putty material into any desired shape, and then drying the same.

2. A manufacturing process of a storage battery separator which process consists of preparing a mixed solvent by mixing cyclohexanone and solvent naphtha at the amount ratio, by weight, of the range between 1 to 3 and 1 to 4, then making a sol solution by dissolving in 4 parts, by weight, of said mixed solvent 1 part, by weight, of powder of polyvinyl chloride which is 1100 in degree of polymerization, making a dough by adding to said sol solution 1.5 to 4 parts by weight, of powder of diatomaceous earth and kneading it therewith, then making a putty material by adding to said dough ½ to ¼ parts, by weight, of ammonium oleate and ½ part of water and kneading them, then extruding said putty material into any desired shape, and then drying the same.

References Cited by the Examiner
UNITED STATES PATENTS
2,772,322  11/56  Witt et al. _____ 136—148

FOREIGN PATENTS
828,683  2/60  Great Britain.

WINSTON A. DOUGLAS, *Primary Examiner.*

JOHN H. MACK, *Examiner.*